Patented Feb. 12, 1929.

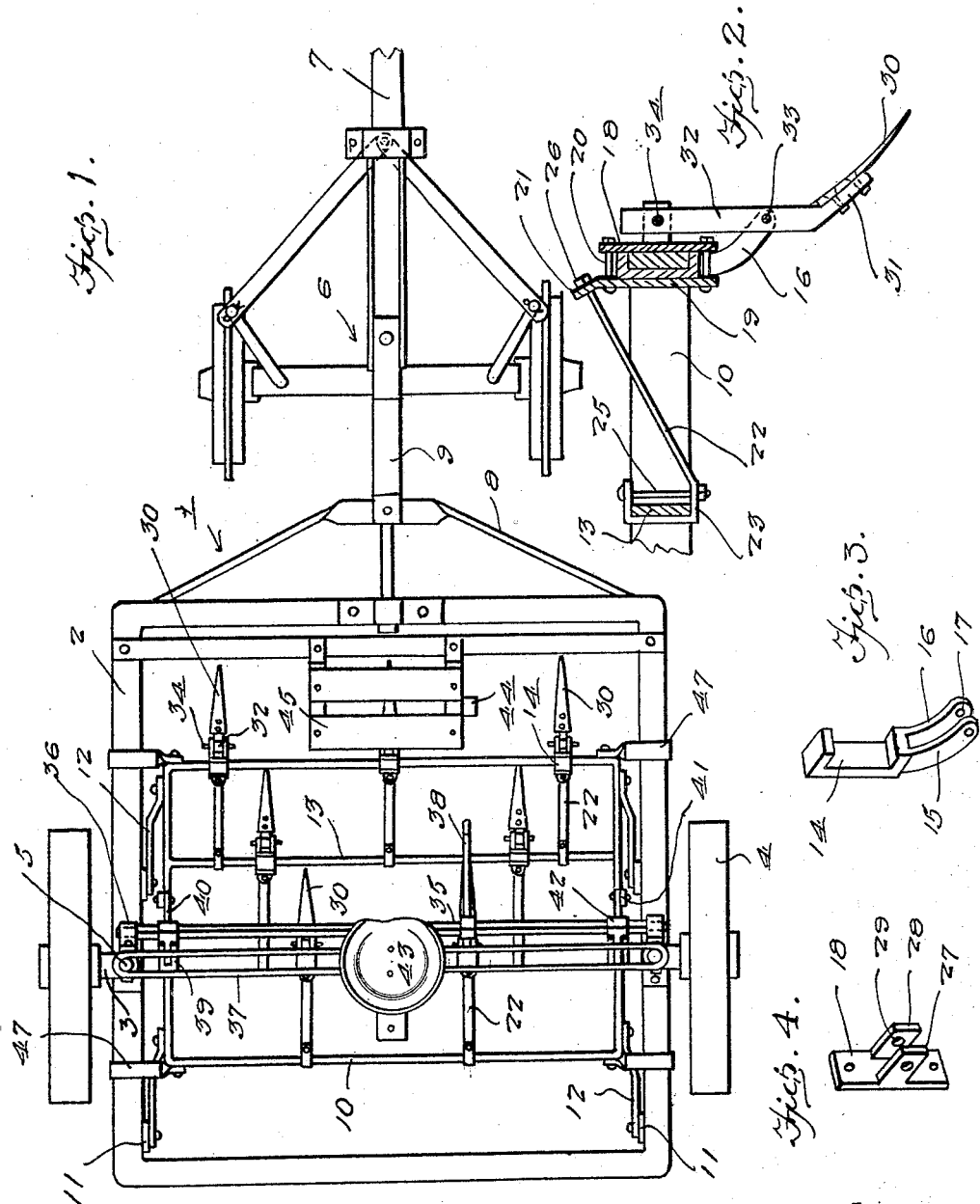

1,701,886

UNITED STATES PATENT OFFICE.

HERMAN HEITMEYER, OF SHELDON, IOWA.

SOIL RENOVATOR.

Application filed September 29, 1926. Serial No. 138,432.

The present invention relates to improvements in agricultural implements and has reference more particularly to a soil renovator.

One of the important objects of the present invention is to provide a soil renovator which includes the provision of ground-engaging shovels which when lowered will enter the ground and break up a clod of dirt which has become hardened thereby loosening the soil and aiding in the cultivation thereof.

A further object of the invention is to provide a soil renovator of the above mentioned character wherein the shovels provided for uplifting the soil are mounted on an auxiliary frame, the auxiliary frame being pivotally suspended from a wheeled main frame, means being provided for effecting the raising and lowering of the shovel-carrying frame.

A further object is to provide a soil renovator of the above mentioned character wherein the shovels are mounted on the pivotally suspended auxiliary frame in such a manner as to permit the shovels to swing rearwardly and upwardly should the shovels encounter stones, roots, or other obstructions while in the ground, thus preventing the shovels from becoming damaged or broken by encountering such obstructions, a readily insertible break pin being associated with the shovel and its mount for normally holding the same in an operative position.

A still further object is to provide a soil renovator of the above mentioned character which is simple in construction, inexpensive, and furthermore adapted to the purposes for which the same is designed.

Other objects and advantages of this invention will become apparent during the course of the following description.

In the accompanying drawing forming part of this specification and in which like numerals are employed to designate like parts throughout the same:

Fig. 1 is a top plan view of the agricultural machine,

Fig. 2 is a detail view showing the shovel-supporting means in section, and the bracing means associated therewith, Fig. 3 is a detail perspective view of a bar-engaging clamp, and Fig. 4 is a detail perspective view of the front face plate which forms a part of the shovel mount.

In the drawings, wherein for the purpose of illustration is shown the preferred embodiment of my invention, the numeral 1 designates generally my improved soil renovator, the same comprising a substantially rectangular main frame 2 which is of formed angle iron material. The frame is supported on the stub axles 3 which extend through intermediate portions of the sides of the frame. Ground-engaging wheels 4 are mounted on the outer ends of the stub axles while the inner ends of the stub axles are disposed upwardly to provide vertical standards 5 the purpose of which will be hereinafter more fully described. This construction is more clearly shown in Fig. 1 of the drawing.

Connected with the forward end of the wheel main frame 2 is a truck designated generally by the numeral 6 and associated with this truck is a draft pole or tongue 7 the purpose of which is well known in the art. The truck forms no important part of the present invention, and may further be of a conventional construction, and a detailed description thereof is thought unnecessary. Suitable bracing means shown at 8 extends from the sides of the main frame 2 at the forward end thereof to the connecting means between the truck and the frame which connecting means is designated by the numeral 9.

An auxiliary frame is pivotally suspended from the wheeled main frame 2 and said auxiliary frame is also substantially rectangular in design and is further of such size as to be adapted to be disposed within the confines of the main frame 2. The auxiliary frame is designated by the numeral 10.

The pivotal suspension means for the auxiliary frame 10 comprises the depending hangers 11 which are secured at their upper ends to the inner faces of the sides of the main frame 2 and are arranged in pairs as is clearly shown in Fig. 2. Suitable links 12 are pivotally secured at one end to the sides of the auxiliary frame 10, the other ends of the links being pivotally attached to the lower ends of the respective hangers 11.

The auxiliary frame 10 has extending between the sides thereof a parallel spaced cross bar 13 and these cross bars cooperate with the front and rear bars on the sides of the auxiliary frame in a manner to be presently apparent. A clamp such as is shown at 14 with reference more particularly to Figs. 2 and 3 of the drawing is disposed against the rear face of each one of the longitudinally extending bars of the auxiliary frame 10, the clamp being substantially U- shaped so that the arms thereof will embrace the upper and lower edges of the bar in the manner clearly shown in Fig. 2. A pair of forwardly curved spaced arms 15 and 16 depend from the bottom of each U-shaped clamp 14 and the lower free ends of these arms are provided with registering openings 17 the purpose of which will be also presently apparent. The U-shaped clamp 14 is rigidly secured on the bar through the medium of the front and rear face plates 18 and 19 respectively. The front plate 18 is disposed against the front face of the bar and abuts the edges of the arms of the U-shaped clamp 14. The rear face plate 19 is disposed against the rear face of the crown portion of the U-shaped clamp and the ends of these face plates project beyond the arms of the U-shaped clamp in a manner clearly shown in Fig. 2. Suitable securing bolts 20 extend between the upper and lower end portions of the face plates whereby the clamp will be rigidly secured on the bars of the auxiliary frame 10. The rear face plate 19 is provided at its upper end with a rearwardly inclined extension 21 and extending through a suitable opening provided in this extension is a threaded end of the flat strip 22 which provides a bracing means for the clamp. This flat strip 22 extends diagonally and the rear end thereof is disposed around the next adjacent cross bar to provide a substantially U-shaped member 23 and a bolt 25 extends through the arms of the U-shaped member 23 for securing the rear ends of the brace around the adjacent cross bar 13 of the frame 10. A nut 26 is threaded on the forward threaded end of the brace which extends through the extension 21 formed on the upper end of the rear face plate 19.

A pair of laterally extending parallel spaced arms 27 and 28 respectively are formed on the intermediate portion of the face plate 18 and these arms are provided with registering openings 29 as is clearly shown in Fig. 4.

The ground-engaging shovels are designated by the numeral 30 and each shovel is supported on the angularly disposed lower end 31 of a suitable shank 32. Any suitable securing means is provided for fastening the shovel on the lower portion of the shank. The shank 32 is pivotally supported between the lower ends of the spaced arms 15 and 16 which depend from the U-shaped clamp 14 and a suitable pin 33 extends transversely through the registering openings 17 and through a suitable opening provided therefor in the intermediate portion of the shank.

The upper end of the shank 32 is adapted to extend between the forwardly projecting parallel spaced arms 27 and 28 carried by the face plate 18 and extending through the registering openings 29 formed in these arms and also through a registering opening formed in the upper portion of the shank 32 is a break pin 34.

The purpose of mounting the shovel in the manner as above described will be hereinafter more fully explained.

As many shovels may be mounted on the auxiliary frame as is desired and the same are preferably arranged in staggered relation as is clearly shown in Fig. 1.

For the purpose of raising and lowering the shovel-carrying frame 10, there is provided a transversely extending square-shaped shaft 35, the ends thereof being round and journaled in suitable bearings 36 which are supported by the cross piece 37, the latter being supported by the upper ends of the posts or standards 5. An elongated lever 38 is secured at its inner end to this square-shaped shaft for effecting the rotation thereof. The shaft 35 is operatively connected with the auxiliary frame 10 through the medium of pivotally connected links 39 and 40. Two pairs of such links are provided, the same being arranged adjacent the respective sides of ends of the auxiliary frame. The lower end of each link 40 is connected to the respective side of the auxiliary frame 10 as at 41 while the upper ends of the links 39 are connected to the shaft 36 as at 42.

The lever 38 is preferably located at point adjacent the seat 43 which is secured on the cross member 37 so that the operator can have ready access to the lever for actuating the same whereby the shovel-carrying frame may be readily and easily lowered or raised.

For the purpose of holding the shovel-carrying frame in a raised position so that the shovels 30 will be maintained out of engagement with the ground, there is provided a suitable hook 44, the same being secured on a platform 45 carried by the forward portion of the wheeled main frame 2 and the free end of the lever 38 is adapted to be disposed in engagement beneath the hook, thereby holding the auxiliary frame in raised position.

When the free end of the lever 38 is disengaged from engagement with the hook 44 and the same is swung upwardly, the auxiliary frame 10 will be caused to swing downwardly so that the shovels 30 will be lowered into the ground and for the purpose of limiting the downward swinging movement of the pivotally suspended auxiliary frame 10, I provide the stop members 47. These stop members are secured at the corners of the auxiliary frame and extend laterally therefrom and are adapted to rest upon the sides of the main frame 2 in the manner clearly shown in Fig. 1.

With the parts arranged as shown in Fig. 1, wherein the shovels are disposed in their lowered operative position, as the machine moves forwardly, the shovels will enter the soil and break up the clods of hardened earth and uplift the soil so as to loosen the same whereby the soil will be cultivated and kept mellow for stimulating the growth of young grass roots or any other vegetation that may be planted in the soil.

Should the shovels encounter an obstruction, such as stones, roots or the like, the pressure of the shovel against said obstruction, will cause the pin 34 to break and thereby permit the shank 32 to swing on its pivot 33 between the spaced arms 15 and 16 thus enabling the shovels to swing upwardly and rearwardly out of engagement with the soil and this arrangement will permit the shovels to ride over such obstructions which have then encountered and thereby prevent the shovels from becoming damaged or broken. The broken pin 34 may be readily and easily replaced with a new one for again securing the shank and its shovel in proper position.

While I have shown the preferred embodiment of my invention, it is to be understood that various changes in the size, shape and arrangement of parts may be resorted to without departing from the spirit or sacrificing any of the advantages of the appended claims.

What I claim is:

1. A soil renovator of the class described comprising a shovel-carrying frame, said frame including a plurality of parallel spaced bars, a substantially U-shaped clamp adapted to be disposed against the rear face of one of said bars, the arms of the U-shaped clamp extending over the upper and lower edges of the bar, a face plate disposed against the front face of the bar and the free ends of the arms of the U-shaped clamp, an additional face plate arranged against the crown portion of the U-shaped clamp, securing bolts extending between the end portions of the face plates, a shovel, a shank therefor, said shank being mounted on the aforementioned clamp.

2. A soil renovator of the class described comprising a shovel-carrying frame, said frame including a plurality of parallel spaced bars, a substantially U-shaped clamp adapted to be disposed against the rear face of one of said bars, the arms of the U-shaped clamp extending over the upper and lower edges of the bar, a face plate disposed against the front face of the bar and the free ends of the arms of the U-shaped clamp, an additional face plate arranged against the crown portion of the U-shaped clamp, securing bolts extending between the end portions of the face plates, a shovel, a shank therefor, said shank being mounted on the aforementioned clamp, and bracing means for the clamp, said bracing means comprising a member extending between one pair of adjacent bars, one end of the brace being secured to the rear face plate, the other end of the brace being secured to the adjacent bar.

3. A soil renovator of the class described comprising a shovel-carrying frame, said frame including a plurality of parallel spaced bars, a substantially U-shaped clamp adapted to be disposed against the rear face of one of said bars, the arms of the U-shaped clamp extending over the upper and lower edges of the bar, a face plate disposed against the front face of the bar and the free ends of the arms of the U-shaped clamp, an additional face plate arranged against the crown portion of the U-shaped clamp, securing bolts extending between the end portions of the face plates, a shovel, a shank therefor, said shank being mounted on the aforementioned clamp, and means for permitting the shovel to automatically be raised when the same encounters an obstruction.

4. In a mount for a shovel, the combination with a supporting bar, of a U-shaped clamp embracing the bar, a pair of co-acting face plates secured together for rigidly mounting the clamp on the bar, a pair of forwardly curved depending arms carried by the clamp, the forward face plate having forwardly projecting ears formed thereon, a shovel, a shank therefor, said shank being pivotally supported intermediate its ends between the free ends of the arms which depend from the clamp, the upper portion of the shank being disposed between the spaced ears carried by the face plate, and a pin extending transversely through the spaced ears and through the upper portion of the shank for holding the shank in a rigid vertical position.

In testimony whereof I affix my signature.

HERMAN HEITMEYER.